United States Patent [19]

Medina Folgado

[11] Patent Number: 5,108,223
[45] Date of Patent: Apr. 28, 1992

[54] ARMORED BREAKWATER

[76] Inventor: Josep R. Medina Folgado, Camino de Vera s/n, 46022-Valencia, Spain

[21] Appl. No.: 591,232

[22] Filed: Oct. 1, 1990

Related U.S. Application Data

[63] Continuation-in-part of Ser. No. 504,239, Apr. 4, 1990, abandoned.

[30] Foreign Application Priority Data

Apr. 6, 1989 [ES] Spain ................................. 8901204

[51] Int. Cl.⁵ .............................................. E02B 3/06
[52] U.S. Cl. ......................................... 405/21; 405/25; 405/30
[58] Field of Search .......................... 405/15, 21, 23, 25, 405/28-31

[56] References Cited

U.S. PATENT DOCUMENTS

| | | | |
|---|---|---|---|
| 1,489,428 | 4/1924 | Cushing | 405/21 |
| 1,987,151 | 1/1935 | Mason | 405/21 X |
| 4,834,578 | 5/1989 | Bores | 405/30 |

FOREIGN PATENT DOCUMENTS

| | | | |
|---|---|---|---|
| 3630053 | 3/1987 | Fed. Rep. of Germany | 405/15 |
| 977065 | 3/1951 | France | 405/21 |
| 1013225 | 7/1952 | France | 405/25 |
| 2444121 | 8/1980 | France | 405/21 |
| 2582693 | 12/1986 | France | |
| 33920 | 7/1922 | Norway | 405/15 |

OTHER PUBLICATIONS

Creager, William et al.: "Engineering for Dams", vol. III: Earth, Rockfill, Steel, and Timber Dams, pp. 783-787 and FIG. 24, John Wiley and Sons, N.Y., 1945.
Dijken, Langs Zee, Rivieren en Kanalen, Kaden, om Polders, Droogmakerijen enz. Samensteling, Aanleg, Onderhoud, "Met 198 Afbeeldingen naar foto's en tekeningen Ohgevers Maatschappij Kosmos" Amsterdam—Antwerpen, p. 40.

*Primary Examiner*—Randolph A. Reese
*Assistant Examiner*—John Ricci
*Attorney, Agent, or Firm*—Ostrolenk, Faber, Gerb & Soffen

[57] ABSTRACT

A mound breakwater comprises an internal core, one or more filter layers of relatively fine material over the core and an armor layer of relatively coarser material over the filter layers. The armor layer protects the structure from breaking waves. The armor layer in the vertical zone between the mean sea levels is thickened with reference to the thickness of the rest of the height of the armor layer. This thickening is achieved by having a uniform slope on the external seaward facing profile of the armor layer but having a concave or deeper or angled internal profile of the armor between the mean sea levels. The internal profile may be angular, truncated, curved, or the like.

12 Claims, 2 Drawing Sheets

ARMORED BREAKWATER

CROSS REFERENCE TO RELATED APPLICATION

This is a continuation-in-part of U.S. patent application Ser. No. 504,239, filed Apr. 4, 1990, now abandoned.

FIELD OF THE INVENTION

The invention is related to the field of mound breakwaters and particularly rubble-mound breakwaters. These structures are designed to provide shelter to specific coastal zones. More specifically, the purpose of the invention is to introduce improvements into what is commonly termed the "armor" of such mound breakwaters. The invention provides the armor with an internal reinforcement which gives the structure a higher reliability and resistance.

BACKGROUND OF THE INVENTION

Mound breakwaters are coastal structures built with concrete units and/or quarry stones of different sizes. The breakwaters are built in the sea or ocean in order to shelter a coastal area The basic elements of the mound breakwater are a core, filter layers atop the core, and armor, either with or without a cap on the crest of the breakwater.

Such a coastal structure causes the sea waves to break on the armor and, subsequently, to reflect and dissipate wave energy.

The core is the main part of the mound breakwater and comprises its largest volume part. The core is designed to resist the geotechnical conditions imposed by the sea bed, the concrete cap, the armor and the other layers of the breakwater. Additionally, the core should be impervious enough to prevent excessive wave transmission through the breakwater and it should also satisfy the hydrodynamic conditions of the sea waves inside the breakwater structure.

The filter layers comprise one layer or several layers of stones of decreasing sizes being of larger sizes outward toward the armor and of smaller size inward toward the core and sea bed. The filter layers are placed on the external surface of the core. Their function is to prevent the loss of smaller breakwater materials from the core through openings of the armor or large stone layers.

The armor, the external part of the breakwater, is placed atop the outer filter layer. The armor is a layer which protects the breakwater structure from the waves and is made of larger size units, such as larger stones. The armor is the basic resistant element of the mound breakwater It is characterized by the type of armor unit the shape, density, weight, gradation, resistance, etc. Stability also depends on the characteristics of the breakwater cross section.

A concrete cap, designed to reduce the waves overtopping the breakwater, may be placed on the breakwater crest.

Having herein defined a mound breakwater, it is important to point out the three basic types of mound breakwaters in existence:
1. The mound breakwaters of "classic design".
2. The "S shaped" breakwaters also called mound breakwaters of the "broken profile" type.
3. The "Berm type" breakwaters, also called "sacrificial type" breakwaters, or "reshaping" mound breakwaters.

Mound breakwaters of classic design have an armor of uniform slope from the bottom to the crest (which is with or without a cap). In these breakwaters of classic design, the armor thickness is approximately constant along the slope. The armor thickness is usually twice the equivalent cube size, or nominal diameter, although this may vary depending on the type of armor unit. Equivalent cube size, or nominal diameter, is the cube root of the average weight divided by the weight density of the armor units.

Mound breakwaters of classic design offer low permeability. One of their drawbacks is that if a sea wave storm exceeds initiation of the damage threshold level, and if the damage progresses into the armor, the permeability of the breaking zone is drastically reduced.

S shaped breakwaters have a nonuniform profile because the slope is flatter in the central part and steeper in the upper and lower parts. This profile looks like an "S" and is therefore termed an "S shaped" breakwater.

The S shaped breakwaters also have an armor of approximately uniform thickness. In comparison with conventional breakwaters, the special profile of S shaped breakwaters gives them a higher degree of resistance, although they have the disadvantage of needing a larger volume of materials for construction. The S shape does allow, however, for the reduction of the weight of the units of the armor, if one considers the same design wave storm for the initiation of damage, and a corresponding cost reduction. However, S shaped breakwaters are difficult to build because of the special required profile.

The third mound breakwater type, the "Berm type" breakwater, has a very large volume, although the stones of the armor may be much lighter than those of conventional rubble-mound breakwaters.

On the other hand, in the "Berm type" breakwaters, the action of the sea waves progressively forms the armor until stability is obtained. The names "reshaping" mound breakwater or dynamic breakwater refers to this process.

The principal advantages of the "Berm type" breakwaters are their reduced cost of construction and smaller required armor stones used. However, the "Berm type" breakwaters require a good deal more material to build, and their long term reliability is low due to longshore transport.

SUMMARY OF THE INVENTION

The improvements, which are the purpose of this invention, have been developed to address the problems found in different types of existing mound breakwaters, and, additionally, to offer the advantages provided by those breakwaters.

The improvements are made on the armor of the breakwaters, which is to say on the basic structural element of the breakwater.

Specifically the improvements are based on a significant increase in the thickness of the armor in the zone, i.e. the height region along the breakwater, where the mean sea level crosses the frontal armor profile. This variable armor thickness will nonetheless maintain the uniform slope of the external armor profile, which is similar to the external slope of a conventional breakwater. Therefore the purpose of the invention is to increase the thickness of the armor layer, but only on its internal side. The invention keeps the external profile of the breakwater the same as that of conventional breakwaters, but, at the same time, it shapes the internal profile of the armor in a concave shape, as viewed from the sea, (or convex viewed from the interior of the breakwater) precisely over the height zone of intersection of the mean sea level and the armor. The resulting thickness in that zone is therefore significantly larger.

To achieve the increased thickness, the internal profile of the armor may be of any of a variety of shapes: angular, trapezoidal, curved, etc. The greatest thickness is intermediate the height between the maximum and minimum sea levels.

The above mentioned thickness zone of the armor makes the armor a different structure in comparison with the armor layers of conventional breakwaters. This alteration of a conventional structure is extremely easy to implement and it introduces a significant improvement in its structural performance with regard to sea wave storms.

Compared to the conventional breakwaters, the breakwater built with an armor profile in accordance with the invention has the following advantages:

Higher permeability of the breakwater is found in the zone where the waves break This is because the armor thickness is greater, and the stability of the armor units is consequently higher, especially if the core and filter layers have low permeability. This allows for reduction of the weight of the armor units, and for the corresponding reduction of construction costs, while maintaining the same resistance to the initiation of damage.

There is a slow reduction of the permeability in the zone of the armor where the waves break, when the sea waves exceed the threshold level of the initiation of damage and the damage progresses into the armor. This gives the breakwater a resistance level quite superior to a conventional structure in which the total failure by the internal filter layers would be exposed. This is generally considered a failure of the armor.

The breakwater in accordance with the invention may be used in areas where the uncertainties of the design load factors are important, i.e. waves without depth-limiting conditions. The range of wave storm intensities which the structure is able to resist, between the initiation of damage and failure, is increased. At low damage levels, the breakwater has a behavior similar to that of a conventional breakwater. At high damage levels, the mound breakwater in accordance with the invention has a behavior similar to that of the "S shaped" breakwater. Its resistance to total failure is increased far beyond that of the conventional breakwater.

On the other hand, the wide range of storm wave intensities able to be resisted is a unique design property of the breakwater of the invention and, as mentioned above, it is a very valuable attribute for building breakwaters under uncertain design factors.

With respect to the S shaped breakwater, the invention offers the following advantages:

The volume of materials necessary for the construction is lower. As a result, the construction cost is lower, because the external profile of the armor is uniform while the internal profile of the armor only shows the upper half of an S shape.

With the same weight of the armor units and volume of materials, the mound breakwater in accordance with the invention having the internal reinforcement of armor, offers a higher level of resistance to total failure, because, in the process of erosion of the armor, the profile changes and the armor units are compacted.

By using the same weight of armor units, the initiation of damage commences before, and the flexibility of the structure is quite superior. This reduces the economic impact of the uncertainties of the design factors on the breakwaters. As a result, the possibilities of sudden collapse of the structure are reduced. Therefore, it increases the possibilities of reinforcing the breakwaters, with satisfactory conditions, even if the breakwater had been originally underdesigned.

Finally, compared to the "Berm type" breakwater, the mound breakwater, in accordance with the invention, has the following advantages:

The alongshore movement of armor units is minimized. The problem of transporting materials along the breakwater in the longshore direction, as found in the case of the "Berm type" breakwater, is therefore significantly reduced.

The required volume of materials for construction is much lower.

The identification of the damage levels is very simple and the long term stability is reliable. This is not verified by the "Berm type" breakwaters, which are designed to adapt the external profile, in accordance with the storm intensity, and eventually to achieve long term stability.

In summary, the change in the mound breakwater structure, in accordance with the improvements of the invention, significantly affects the structural behavior by substantially increasing its resistance to total failure. On the other hand, the resistance to initiation of damage is also slightly increased. This behavior gives the mound breakwaters a flexibility in their response that is quite superior to the existing breakwater designs previously described. The invention is useful for breakwaters exposed to wave storms with high uncertainty and in cases in which a possible total failure of the breakwater structure may cause important economic losses.

The new mound breakwater design is valid for all types of armor units, with or without a cap on the crest. However, the utility of the invention is maximized with robust armor units (quarry stones, blocks, etc.) and mound breakwaters under high design uncertainties and important economic losses in the case of total failure of the breakwater (deep areas).

Additionally, the increased armor thickness in the zone of contact of the mean sea level with the external breakwater profile gives the breakwaters the greater part of the best properties of those mound breakwaters in existence.

In short, a mound breakwater built in accordance with the improvements of the invention is as easy to construct and to monitor as the conventional mound breakwater of classic design, and it is more resistant than an "S shaped" breakwater in the vicinity of the total failure point. Additionally, it is adjustable but much more stable than the "Berm type" breakwater, and it provides the whole structure with maximum flexibility. That flexibility is quite valuable in cases when it is necessary to admit large uncertainties in the design wave storm.

Other features and advantages of the present invention will become apparent from the following description of the invention which refers to the accompanying drawings.

BRIEF DESCRIPTION OF THE DRAWINGS

In order to complete the description of the proposed mound breakwater type and to contribute to a better understanding of the characteristics of the invention, drawing Figures are used to illustrate, and not to limit the invention.

DESCRIPTION OF PREFERRED EMBODIMENTS OF THE INVENTION

In the four Figures, one can see that the breakwater obtained using the claimed improvements varies from Figure to Figure in its armor layer profile where the armor thickness increases. The breakwaters in FIGS. 1 and 2 do not incorporate a cap, while the breakwaters of FIGS. 3 and 4 have a cap. A cap is a conventional element and may be incorporated or not in the mound breakwater.

Figure 1:
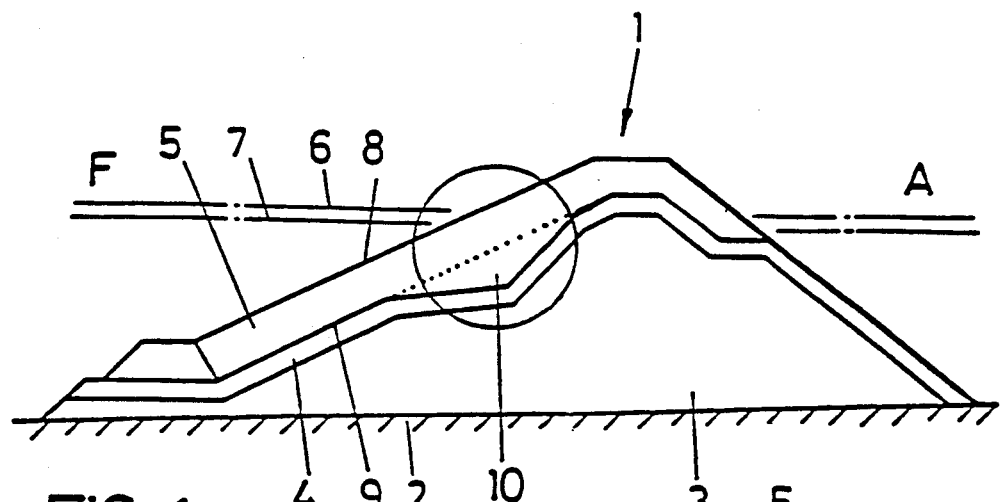
FIG. 1 shows a section of a schematic representation of a mound breakwater built with the improvements of the invention, i.e., with a larger armor thickness, which yields increased stability. This is in accordance with the internal profile of the armor.
Figure 1A:
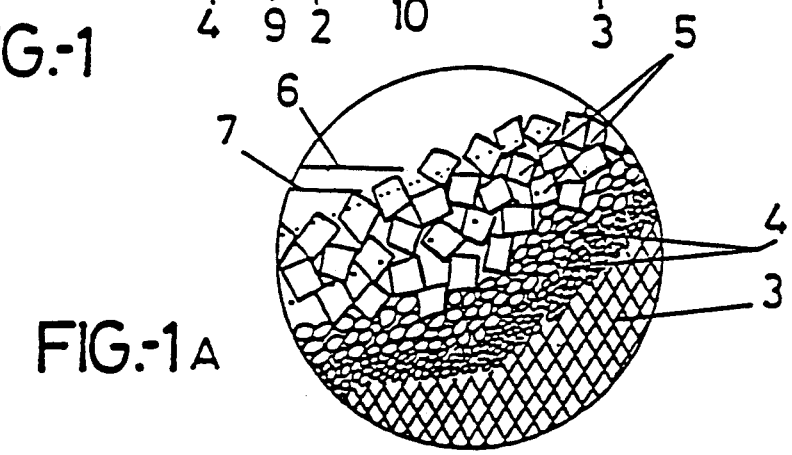
FIG. 1A shows the basic construction of the armor, the filter layers, and the core, in greater detail.

What is fundamental and new in the invention is the local increases of the armor layer thickness in the critical area as heretofore described FIG. 1 shows a general mound breakwater 1, placed on a sea bed 2. This breakwater shows a frontal zone "F" at the front, seaward facing side, on which the waves would break, and a sheltered zone "A" at the rear facing side, which is logically the sheltered zone with respect to the incident waves. The breakwater 1 includes a corresponding upstanding core 3, whose structure and utility have been previously shown. The core is of sand, fine materials or other standard core materials for breakwaters. Filter layers 4 are placed on the core 3. As noted above, the filter layers are of coarser rock, or the like, generally coarser than the core material, but finer than the armor materials.

Atop the filter layers 4 is placed the armor 5 which is comprised of one layer or of several layers of a variety of materials, to protect the general breakwater structure from the waves. The material of the armor may be larger rocks, quarry stones or the like very coarse materials.

FIG. 1 shows the maximum and minimum mean sea levels 6 and 7, which are the levels of high tide 6 and low tide 7, respectively.

In the invention, the armor 5 offers a uniform slope in its external or seaward facing profile 8, while its internal profile 9 offers a greater thickness 10, i.e. it is concave as seen from the seaward side, over the height zone where the mean sea level crosses the frontal slope of the breakwater. The greatest thickness is intermediate the height between the maximum and minimum sea levels. The thickened zone or the zone with a larger thickness 10 provides an increase in the stability of the armor layer and, in consequence, gives the breakwater 1 a higher resistance and stability, as has already been described.

In FIG. 1, the reinforcement 10 of angular configuration has been represented. Its internal profile defines an angle.

Figure 2:
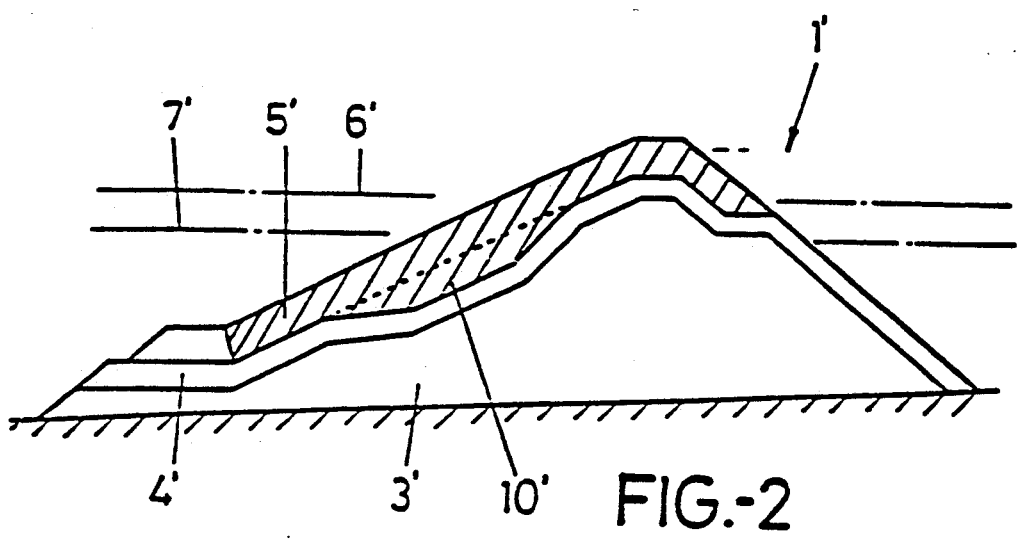
FIG. 2 shows a similar view in which the increased thickness, constituted by the zone with larger armor thickness, varies with respect to the profile corresponding to the reinforcement shown in FIG. 1.

FIG. 2 shows a breakwater 1' with similar characteristics to that in FIG. 1. FIG. 2 shows the corresponding core 3', filter layers 4', armor 5' and increased thickness 10', and offers, in this case, an approximately trapezoidal profile. In FIG. 2 one sees a larger tidal range, i.e., a large distance between the levels of high tide 6' and low tide 7'.

In FIGS. 1 and 2, one sees the breakwater without a cap.

Figure 3:
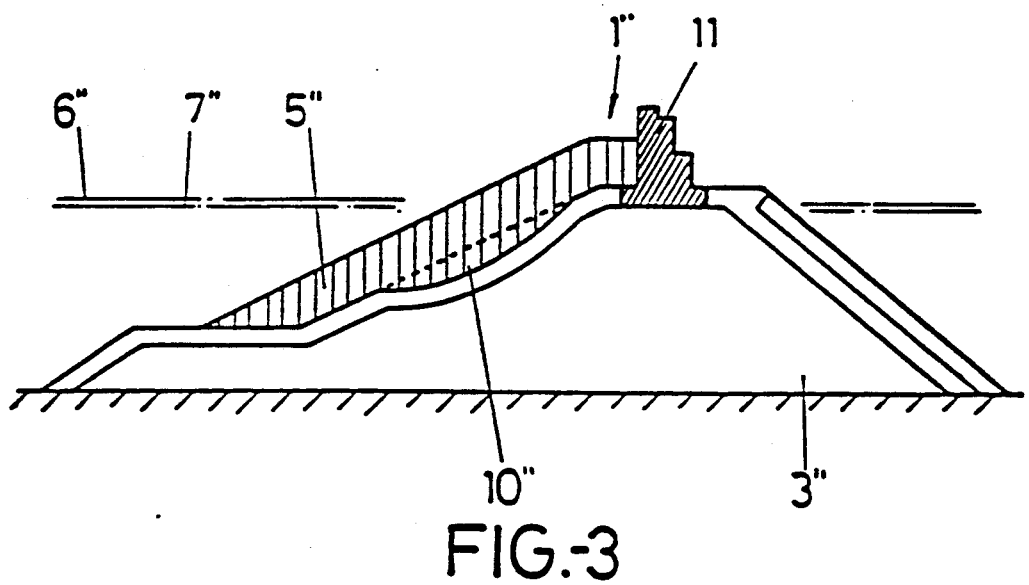
FIGS. 3 and 4 show different views of the section and/or plan of schematic representations of a breakwater with a cap on the crest, where the reinforcement or larger armor thickness is shown as a concave curve.
Figure 4:
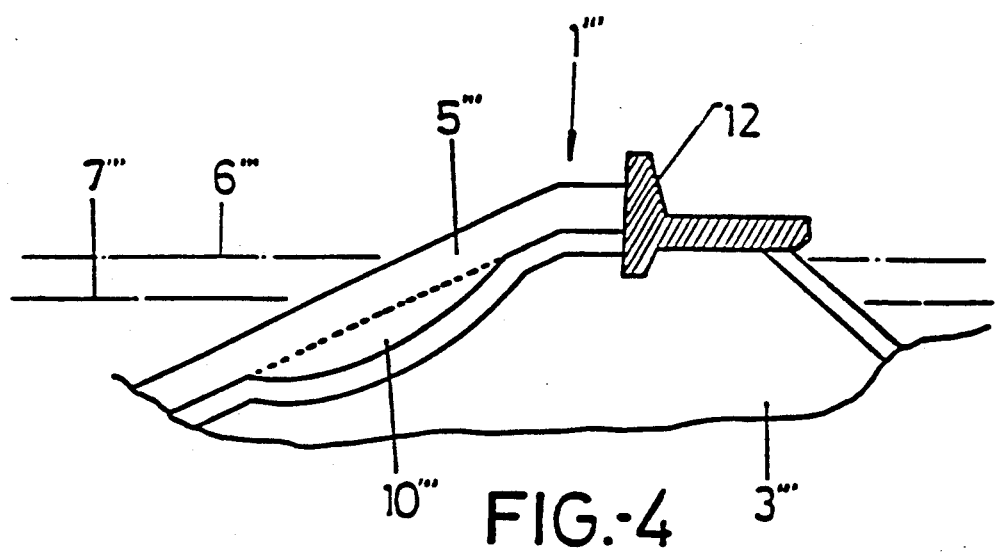

FIGS. 3 and 4 show two analogous breakwaters 1" and 1''', which vary in the amplitudes of their reinforcements 10" and 10''', and in the configurations of their caps 11 and 12 because the breakwaters 1" and 1''' have incorporated caps in each case.

The internal profile of the reinforcement 10" and 10''' of the breakwater is a concave curve facing the sea. The remaining elements are referred to in a manner similar to the previously described Figures. The cores are 3" and 3''' respectively; the armors are 5" and 5''', and the mean sea levels are 6"-7" and 6'''-7'''. As in the cases of FIGS. 1 and 2, also in FIGS. 3 and 4, the frontal and sheltered zones of the breakwater are exactly the same.

In summary, the breakwater incorporates a new corresponding armor 5-5'-5"-5''', which shows a superior external profile or slope to be totally uniform, while having an internal profile with an increased thickness which constitutes a reinforcement 10-10'-10"-10''', respectively. This gives the structure a higher resistance and reliability. That increase of thickness, or the reinforcement which determines it, is established in correspondence with the zone where the mean sea levels, depending on the tide, cross the external profile of the armor.

The materials, shapes, sizes and disposition of elements may vary if they do not alter significantly the essence of the invention.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. An armored breakwater for use in a body of water, the body of water having a varying level between maximum and minimum mean water levels, the breakwater having a first side facing wave action from said body of water and an opposite side; the breakwater comprising:
   an upstanding core;
   at least one filter layer covering the core;
   a layer of armor covering the filter layer and protecting the breakwater from wave action; the armor having an external profile on the first side, the external profile having a substantially uniform slope; the armor extending along the filter layer and to a topmost point of the breakwater; the armor having an internal profile facing the filter layer, the internal profile being shaped so as to form a zone of greater thickness between the external and internal profiles, the armor thereby having a generally convex shape at the zone in cross section, the zone extending generally along the breakwater where the mean water levels of the body of water cross the external profile of the armor, the zone of greater thickness extending to a level below the topmost point of said breakwater, leaving a portion of said armor layer above the zone without a greater thickness, the greater thickness zone of the armor increasing the resistance of the breakwater to damage.

2. The breakwater of claim 1, wherein the armor layer comprises relatively coarser material and the filter layer comprises relatively finer material.

3. The breakwater of claim 2, wherein the core comprises still finer material than the filter layer.

4. The breakwater of claim 1, wherein the zone of greater thickness of the armor has a maximum thickness in the zone intermediate between the maximum and minimum mean levels.

5. The breakwater of claim 4, wherein the internal profile of the greater thickness zone is generally angular in shape to define the general convex shape thereof.

6. The breakwater of claim 5, wherein in the zone, the internal profile of the armor has a generally trapezoidal shaping, and wherein the trapezoidal shaping includes a base that faces the first side; and a line drawn through the base of the trapezoidal shaping and the internal profile of the armor layer is generally parallel to the external profile of the armor layer.

7. The breakwater of claim 4, wherein the internal profile of the armor layer in the zone is curved such that the internal profile is convexly curved facing interiorly in the breakwater and concavely curved viewed from the first side for providing a greater thickness in the zone.

8. The breakwater of claim 1, wherein the breakwater has a tope, and a cap on the top of the breakwater, the cap disposed behind the armor layer and above the mean water levels.

9. A breakwater for use in a body of water, the body of water having a varying water level between maximum and minimum mean water levels, the breakwater having a first side facing wave action and an opposite side, the breakwater comprising:

an upstanding core; and a layer of armor covering the core and protecting the breakwater from wave action, the armor having an external profile on the first side, the external profile having a substantially uniform slope, the armor extending along the core and to a topmost point of the breakwater, the armor having an internal profile facing the core, the internal profile being shaped in a zone such that the armor layer extends into the core, thereby providing the armor layer with an internal profile having a generally convex shape at the zone, the zone extending generally along the breakwater where the mean water levels of the body of water cross the external profile of the armor, the zone extending to a level below the topmost point of said breakwater, leaving a portion of said armor layer above the zone without a greater thickness, thereby giving the armor greater thickness in the zone while maintaining a uniform external slope of the armor and increasing the resistance of the breakwater to damage; and further comprising at least one filter layer disposed between the armor layer and the core.

10. The breakwater recited in claim 9, wherein the zone of greater thickness of the armor has a maximum thickness in the zone intermediate between the maximum and minimum mean water levels.

11. The breakwater recited in claim 9, wherein the internal profile is shaped such that the zone of greater thickness is generally angular in shape, thereby defining the generally convex shape thereof.

12. The breakwater recited in claim 9, wherein the internal profile of the armor layer in the zone is rounded such that the internal profile is convexly curved viewed from the first side for providing a greater thickness in the zone.

* * * * *